United States Patent
Rambow

Patent Number: 5,001,342
Date of Patent: Mar. 19, 1991

[54] RADIOACTIVE TRACER CEMENT THICKNESS MEASUREMENT

[75] Inventor: Frederick H. K. Rambow, Houston, Tex.

[73] Assignee: Shell Oil Company, Houston, Tex.

[21] Appl. No.: 368,520

[22] Filed: Jun. 20, 1989

[51] Int. Cl.$^5$ .............. G01V 5/04; G01V 5/00
[52] U.S. Cl. ................. 250/260; 250/259; 250/266; 250/270; 250/303
[58] Field of Search .......... 250/253, 256, 257, 258, 250/259, 260, 264, 265, 266, 267, 269, 270, 303

[56] References Cited

U.S. PATENT DOCUMENTS

| | | | |
|---|---|---|---|
| 2,220,205 | 11/1940 | Buckley | 166/253 |
| 2,322,634 | 6/1943 | Howell et al. | 250/265 |
| 2,686,881 | 8/1954 | Herzog et al. | 250/265 |
| 2,909,664 | 10/1959 | Armistead | 250/265 |
| 2,967,933 | 1/1961 | Scherbatskoy | 250/264 |
| 3,315,076 | 4/1967 | Jordan | 250/252.1 |
| 3,521,065 | 7/1970 | Locke | 250/264 |
| 4,032,778 | 6/1977 | Paap et al. | 250/266 |
| 4,032,780 | 6/1977 | Paap et al. | 250/266 |
| 4,035,640 | 7/1977 | Arnold et al. | 250/266 |
| 4,057,720 | 11/1977 | Paap et al. | 250/266 |
| 4,092,536 | 5/1978 | Smith | 256/265 |
| 4,122,341 | 10/1978 | Smith, Jr. | 250/267 |
| 4,129,777 | 12/1978 | Wahl et al. | 250/264 |
| 4,731,531 | 3/1988 | Handke | 250/259 |
| 4,825,073 | 4/1989 | Smith, Jr. et al. | 250/260 |

OTHER PUBLICATIONS

"Quantitative Monitoring of Water Flow Behind and in Wellbore Casing," by D. M. Arnold and H. J. Paap, *Journal of Petroleum Technology*, Jan. 1979, pp. 121-130.

*Primary Examiner*—Constantine Hannaher
*Assistant Examiner*—Edward J. Glick

[57] ABSTRACT

A process for measuring the thickness of the cement surrounding a casing in a borehole wherein a radioactive tracer is mixed with the cement and the response is monitored to determine the cement thickness. An alternate method is the mixing of a material with the cement that can be activated by a neutron source with the resulting activity being measured to determine the cement thickness.

7 Claims, 1 Drawing Sheet

FIG.1
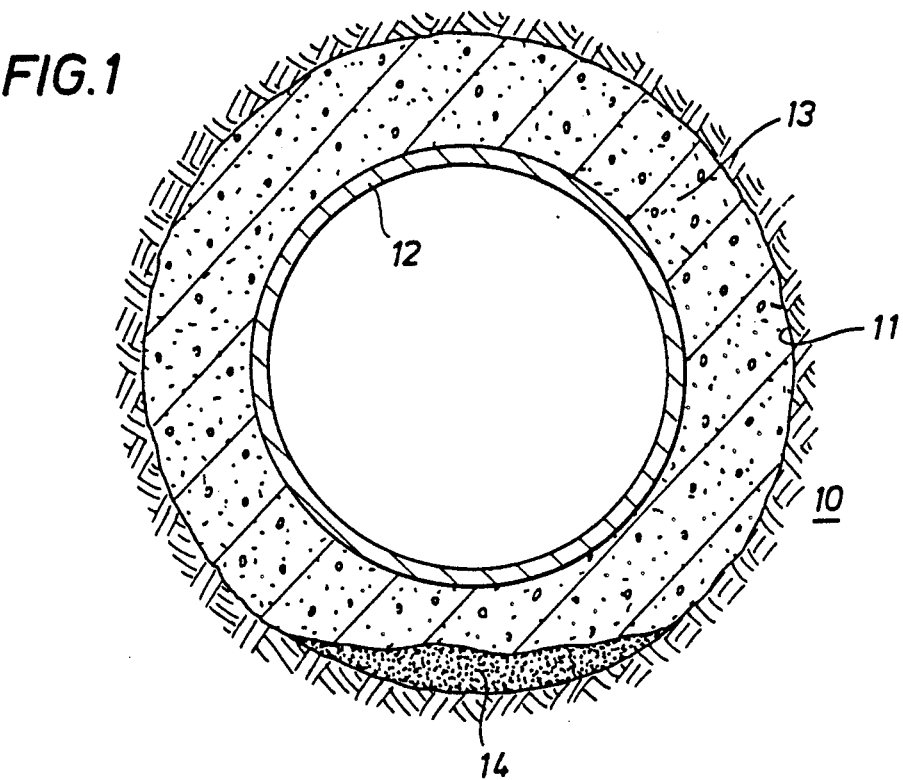
FIG.2
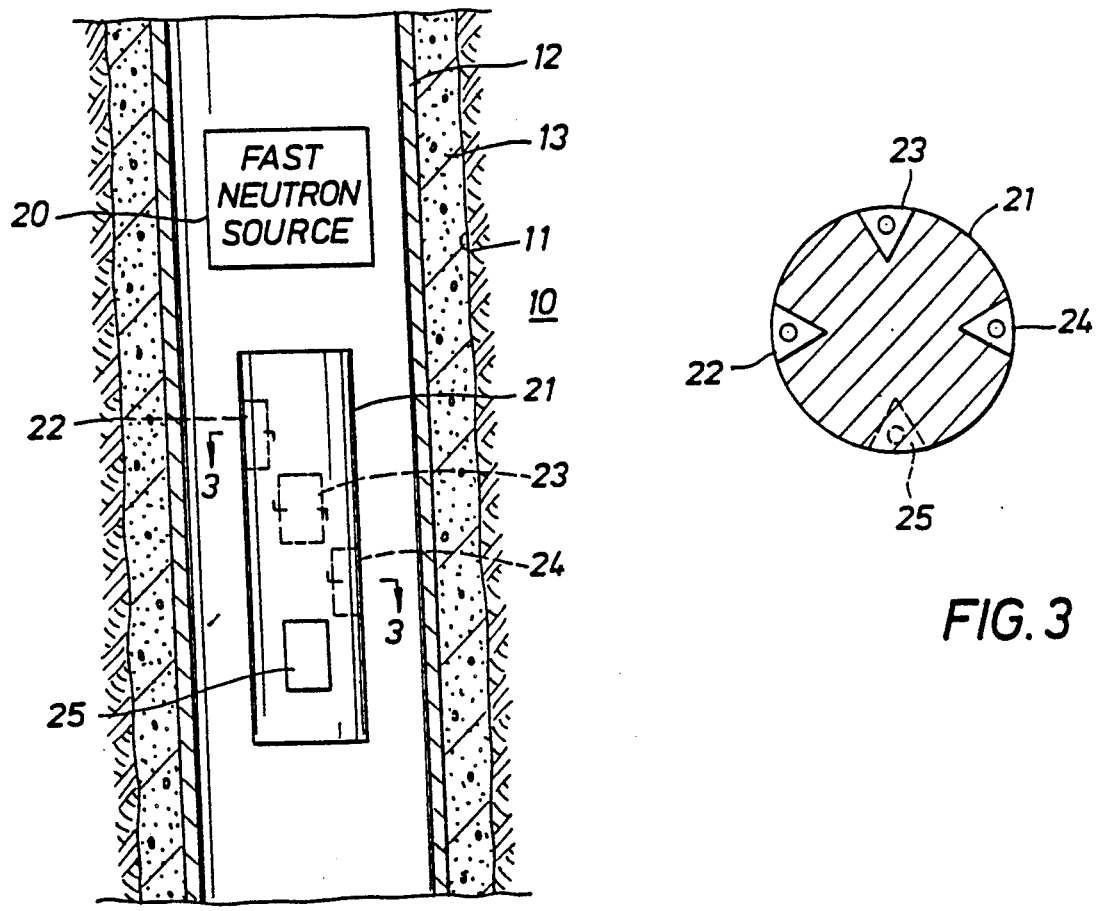
FIG.3

RADIOACTIVE TRACER CEMENT THICKNESS MEASUREMENT

BACKGROUND OF THE INVENTION

The present invention relates to oilfield operations and more particularly to a method for determining the quality of a cementing job. The term "cementing job" refers to the placing of a cement between a steel casing lowered into a borehole and the earth formation to isolate one formation from another formation. The casing also serves to prevent the formation from caving or falling into the bottom of the borehole. This is particularly done in the case where it is desirable to isolate the various formations to prevent undesired fluid communication between the formations.

Undesired fluid communication between formations is particularly a problem where fresh water formations are present. Obviously, any communication between a formation, such as a salt water formation and a fresh water formation, would contaminate the fresh water supply. Thus, it is important that the cement between the casing and the formation provide a fluid-tight seal and prevent any fluid communication between various formations.

Various methods have been developed to determine the quality and effectiveness of the cementing job. The most commonly used method is an acoustical evaluation process. In this process acoustical pulses are transmitted through the casing into the formation and the reflected signal is detected and recorded. The amplitude of the returning signal is analyzed to detect the presence of voids in the cement. A low amplitude signal normally indicates the presence of a void.

This acoustical evaluation fails to detect minor channels in the cement that would permit fluid flow between formations. The acoustical evaluation also fails to detect the presence of a mud sheath between the cement and the formation. The term 'mud sheath' is used to refer to the sheath or cake of solids contained in the drilling mud that is deposited along the borehole wall during drilling operations to prevent fluid inflow into the well during drilling. As is well known, drilling muds used in drilling operations contain suspended solids that may be deposited on the borehole wall to form an effective mudcake or seal. During cementing operations it is necessary to remove this mudcake to provide a good fluid seal between the cement and the borehole wall. Failure to remove the mudcake will leave a mud sheath which can provide a path for fluid communication between the formations and defeat the purpose of the cementing job. Conventional acoustic evaluation services do not detect the presence of a mud sheath since the mud sheath appears similar to conventional cement in the acoustic signal and does not appear as a void or other anomaly.

U.S. Pat. No. 4,035,640 discloses an alternate method to the acoustic method for detecting fluid channeling through the cement bond. In this patent there is disclosed a well tool having a fast pulse neutron source for irradiating the formations behind the well casing. The irradiation activates the oxygen nuclei which would be present in the water flowing in a channel in the cement bond. Gamma detectors are then used to detect the unstable isotope produced when the oxygen nuclei captures a slow neutron. While this system detects the presence o: channels in the cement bond in which fluid is flowing, it will not detect a static mud sheath in which there is no fluid flow. The mud sheath can be easily washed out over time by the formation fluid which would result in unwanted fluid flow between the formations.

SUMMARY OF THE INVENTION

The present invention solves the above problems by providing a method for measuring the actual thickness of the cement that surrounds the casing. By measuring the actual cement thickness one can easily detect the presence of a mud sheath between the cement and the borehole wall. The system also detects off-centered casing and distinguishes an off-centered casing from a mud sheath between the cement and the borehole wall.

The method dopes the cement with an element that can be irradiated with fast neutrons to produce a gamma response. Various elements are available for performing this function, for example, iodine can be irradiated with neutrons to produce iodine 131 or 132, both of which emit gamma rays. In addition, iodine would be an excellent material since its isotopes 131 and 132 have a very short half-life. Further, iodine does not normally occur in earth formations and the presence of iodine in the cement will not produce false readings in other logging operations.

In place of using iodine, one could also dope the cement with a radioactive isotope, for example, iodine 131 or 132, and eliminate the need for irradiating the cement with a fast neutron source. The use of a radioactive isotope does cause problems in that special procedures must be observed in handling the isotope and the equipment used for placing the cement in the borehole must be cleaned to remove all traces of the isotope.

After the cement has set a suitable logging tool is lowered through the well casing to measure the cement thickness. The logging tool would include a fast neutron source similar to that described in U.S. Pat. No. 4,035,640. The neutron source will irradiate the cement which is doped with iodine and convert the iodine to either iodine !31 or 132 which will then produce gamma radiation. The gamma radiation is then detected by a series of suitable radiation detectors such as scintillation counters or similar devices. It is preferable that a plurality of detectors spaced circumferentially around the borehole be used to provide a complete thickness measurement of the cement in one pass of the tool through the borehole.

The same operation is performed when a radioactive isotope is included in the cement except the use of a fast neutron source is unnecessary. Again, a plurality of detectors should be used to make a complete survey of the borehole in a single pass.

The data from the radiation detectors can then be displayed in various formats. For example, the signals from the individual detectors can be displayed in relation to the depth of the borehole at which the measurements were made. The strength of the signals will indicate the thickness of the cement at the depth of the measurements. Also, the signals can be used to produce a polar plot which would give a visual picture of the variation in the thickness of the cement. By comparing the signals from the detectors with a previous caliper survey of the borehole one can easily determine whether there is a mud sheath present along the borehole wall.

BRIEF DESCRIPTION OF THE DRAWINGS

The present invention will be more easily understood from the following detailed description when taken in conjunction with the attached drawings in which:

FIG. 1 is a cross section of a borehole showing a casing installed therein with a mudcake along one portion of the borehole.

FIG. 2 is a vertical section of a cased borehole showing one means for making the measurements of this invention.

FIG. 3 is a section taken along line 3—3 of FIG. 2 showing the position of the various measuring instruments.

DESCRIPTION OF PREFERRED EMBODIMENTS

Referring now to FIG. 1, there is shown a cross section of a cased borehole 11 in an earth formation 10. The casing 12 is shown centered in the borehole and surrounded by cement 13. At the bottom of the drawing there is shown a portion of the mudcake 14 which was not removed during the cementing operation. As explained above, the presence of the mudcake 14 raises the possibility of fluid communication being established between the formations which it is desired to isolate by means of the cement seal 13. In particular, the fluids will tend to wash out the mudcake and provide a channel between the two formations. Thus, it is important that the presence of the mudcake be detected so that steps can be taken to effectively isolate the two formations.

The process of cementing casing in a borehole is well understood by those skilled in the art. Briefly, it consists of installing the casing 12 in the borehole 11. At times mechanical scratching devices are placed at intervals along the casing so that the casing can be reciprocated in the borehole in an attempt to remove the mudcake from the borehole wall during the cementing operation. The cement is then pumped down the casing and flows out the bottom of the casing and up the annulus between the casing and the borehole while the casing is reciprocated to remove the mudcake. After the cement is pumped into the casing it is placed under pressure by inserting a suitable plug in the casing and pumping it down the borehole to physically displace the cement from the casing into the annulus between the casing and the borehole. The use of mechanical scrapers plus the positive displacement of the cement is relied upon to displace or remove the mudcake from the borehole wall. Even with these procedures mudcake often remains on the borehole wall and provides the possibility of a channel forming along the borehole wall. The forming of a channel would allow fluid communication between the formations which are to be isolated. This normally occurs when the casing is off-center in the borehole and the cement tends to favor the larger annular area on one side of the casing. Thus, the washing or mud removal effect of the cement being pumped into the annular area on the low side is reduced.

As explained above, the cement 13 includes either a material which can be activated by a fast neutron source to provide gamma rays or a radioactive tracer which emits gamma rays. The preferred method would be to include a material such as an iodine, for example iodine 130, in the cement as it is pumped into the borehole. The iodine can then be activated by a fast neutron source to produce gamma rays. The fast neutrons will be slowed by the cement to thermal velocities. The slow neutrons are then absorbed by the iodine. Upon absorption of the neutron the iodine will form isotopes 131 and 132 with the release of gamma rays which can be detected. The magnitude of the gamma rays can be used as a direct measurement of the thickness of the cement. Further, any variation in the magnitude of the detected gamma rays will indicate either an off-centered casing or the presence of a mud sheath along the borehole wall.

Another material that could be included in the cement is tellurium 130 or tellurium 130 dioxide. Both of these materials can be irradiated with neutrons to produce iodine 131.

Referring to FIGS. 2 and 3 there is shown in diagrammatic form an instrument which can be used to make the necessary gamma ray measurements in the borehole. In particular, there is shown a neutron source 20 which is used for activating the material dispersed in the cement 13. The source can be a source similar to those available in commercial logging tools and described in the above referenced patent. Positioned below the source and isolated from the source by suitable shielding means is a measuring sonde 21. The sonde 21 contains four gamma ray detectors 22, 23, 24, and 25 which are disposed in a spiral arrangement with the detectors arranged at 90-degrees with respect to each other. The arrangement of the detectors is more easily seen in the cross section shown in FIG. 3. For improved resolution, six detectors arranged at 60-degrees with respect to each other could be used. The detectors may be conventional gas-discharge type gamma ray detectors, scintillation detectors, or more modern solid state detectors. The signals from the individual detectors can be multiplexed and transmitted to the surface over conventional well logging cables. In addition, the orientation of the sonde in the borehole should be determined by various means. For example, one can use a fluxgate magnetometer which is rotated to provide a signal indicating magnetic north when the measurements are made. This type of orientation device is described in numerous patents relating to borehole televiewers. Both the multiplexing of the signals and determining the orientation of the sonde in the borehole is well within the skill of those engaged in the conventional well logging practices.

The data from the logging tool is recorded at the surface on a suitable recording system. The system should include both means for forming a permanent record of the signals from the four detectors plus the fluxgate magnetometer, preferably in both a digital form, and visual recording. The visual recording of the signals may consist of four individual traces representing the magnitude of the signals. By providing a visual record the signals can be continuously monitored to detect any abnormalities. It is much preferred to detect the off-centered casing or the presence of a mud sheath at the well site so that corrective action can be taken before all the cementing equipment is released.

From the above description it can be appreciated that the invention has provided a simple means by which the thickness of the cement sheath around a casing disposed in a borehole can be accurately measured. The method does not require the introduction of radioactive materials into the cement but instead can utilize non-radioactive materials which can be activated in the borehole by a fast neutron source. Of course, it is also possible to use radioactive tracers and disperse them in the cement. This of course, would require that the cementing equipment be cleaned to remove the traces of the radioactive material after completion of the cementing job.

What is claimed is:

1. A method for determining the thickness of the cement surrounding a casing in a borehole comprising:
   introducing a radioactive tracer with the cement as it is pumped into the borehole;
   allowing the cement to set;
   measuring the amplitude of the radioactivity emitting from the set cement at a plurality of locations around the circumference of the borehole; and
   utilizing the measured radioactivity to determine the thickness of the cement surrounding the borehole at various positions around its circumference.

2. A method for determining the thickness of cement surrounding a casing in a borehole comprising:
   introducing a material into the cement as it is pumped into the borehole, said material being capable of capturing slow neutrons and releasing gamma radiation;
   allowing the cement to set in said borehole;
   irradiating the set cement with fast neutrons;
   measuring the amplitude of the gamma radiation emitted from said set cement after irradiation with fast neutrons at a plurality of locations around the circumference of the borehole; and
   utilizing the measured radioactivity to determine the thickness of the cement surrounding the borehole at various positions around its circumference.

3. The method of claim 1 or 2 wherein the measurements are made at least four locations equally spaced around the circumference of the borehole.

4. The method of claim 2 wherein the material introduced into the cement is iodine 130.

5. The method of claim 2 wherein the material introduced into the cement is tellurium 130.

6. A method for determining the thickness of the cement surrounding a casing in a borehole and detecting the presence of a mud sheath between the cement and the borehole wall, said method comprising:
   introducing a radioactive tracer with the cement as it is pumped into the borehole;
   allowing the cement to set;
   measuring the amplitude of the radioactivity emitting from the set cement at a plurality of locations around the circumference of the borehole;
   utilizing the measured radioactivity to determine the thickness of the cement surrounding the borehole at various positions around its circumference; and
   detecting the presence of a mud sheath between the cement and the borehole wall by comparing the thickness of the cement with prior measurement of the borehole diameter.

7. A method for determining the thickness of cement surrounding a casing in a borehole and detecting the presence of a mud sheath between the cement and the borehole wall, said method comprising:
   introducing a material into the cement as it is pumped into the borehole, said material being capable of capturing slow neutrons and releasing gamma radiation;
   allowing the cement to set in said borehole;
   irradiating the set cement with fast neutrons;
   measuring the amplitude of the gammas radiation emitted from said set cement after irradiation with fast neutrons at a plurality of locations around the circumference of the borehole;
   utilizing the measured radioactivity to determine the thickness of the cement surrounding the borehole at various positions around its circumference; and
   detecting the presence of a mud sheath between the cement and the borehole wall by comparing the thickness of the cement with prior measurements of the borehole diameter.

* * * * *